United States Patent
Zhang et al.

(10) Patent No.: US 10,328,533 B2
(45) Date of Patent: Jun. 25, 2019

(54) HYBRID LEAD-FREE SOLDER WIRE

(71) Applicant: Indium Corporation, Utica, NY (US)

(72) Inventors: Hongwen Zhang, New Hartford, NY (US); Ning-Cheng Lee, New Hartford, NY (US)

(73) Assignee: INDIUM CORPORATION, Utica, NY (US)

( * ) Notice: Subject to any disclaimer, the term of this patent is extended or adjusted under 35 U.S.C. 154(b) by 0 days.

(21) Appl. No.: 15/725,265

(22) Filed: Oct. 4, 2017

(65) Prior Publication Data

US 2018/0029170 A1 Feb. 1, 2018

Related U.S. Application Data

(62) Division of application No. 15/076,386, filed on Mar. 21, 2016, now Pat. No. 9,802,274.

(51) Int. Cl.
| | | |
|---|---|---|
| *B23K 35/00* | (2006.01) | |
| *B23K 35/26* | (2006.01) | |
| *B23K 35/02* | (2006.01) | |
| *C22C 12/00* | (2006.01) | |

(52) U.S. Cl.
CPC ........ *B23K 35/264* (2013.01); *B23K 35/0227* (2013.01); *C22C 12/00* (2013.01)

(58) Field of Classification Search
CPC .............. B23K 35/264; B23K 35/0227; B23K 35/0222–35/025; C22C 12/00
USPC ........................ 228/244–255, 56.3
See application file for complete search history.

(56) References Cited

U.S. PATENT DOCUMENTS

| | | | |
|---|---|---|---|
| 1,248,506 A | 12/1917 | Lavine | |
| 2,362,893 A | 11/1944 | Durst | |
| RE30,348 E | 7/1980 | Hascoe | |
| 6,186,390 B1 | 2/2001 | Tadauchi | |
| 6,518,505 B1 * | 2/2003 | Matsui | H01B 1/026 174/126.1 |
| 8,283,783 B2 | 10/2012 | Yamada | |
| 2003/0019661 A1 * | 1/2003 | Aoyama | H01B 1/026 174/126.1 |
| 2005/0211461 A1 * | 9/2005 | Horikoshi | C25D 5/10 174/117 FF |
| 2011/0068151 A1 | 3/2011 | Oh | |
| 2014/0124925 A1 | 5/2014 | Sidhu | |
| 2016/0244891 A1 | 8/2016 | Son | |

FOREIGN PATENT DOCUMENTS

JP 2000073154 8/1998

* cited by examiner

*Primary Examiner* — Kiley S Stoner
(74) *Attorney, Agent, or Firm* — Sheppard, Mullin, Richter & Hampton LLP

(57) ABSTRACT

A braided solder wire rope includes a first alloy including Bi—Ag, Bi—Cu, Bi—Ag—Cu, or Bi—Sb; and the second alloy including Sn, In Sn—Ag, Sn—Cu, Sn—Ag—Cu, Sn—Zn, Bi—Sn, Sn—In, Sn—Sb or Bi—In, such that the second alloy controls an interface reaction chemistry with various metallization surface finish materials without interfering with a high temperature performance of the first alloy. The first alloy may have a solidus temperature around 258° C. and at least the first alloy of the first wire and the second alloy of the second wire may be braided together.

25 Claims, 5 Drawing Sheets

| First Alloy wire | | Second Alloy Wire | | Numbers of first alloy wires/Number of the second alloy wires | Example Pattern |
|---|---|---|---|---|---|
| Composition | Diameter | Composition | Diameter | | |
| Bi11Ag | a | Bi5Sn | a | 4:3 | |
| Bi11Ag | a | Bi20Sn | 0.67a | 5:2 | |
| Bi11Ag | a | Bi20Sn | 0.67a | 4:3 | |
| Bi11Ag | a | Bi20Sn | 0.4a | 4:5 | |
| Bi3Ag | a | Bi20Sn | 0.4a | 4:2 | |
| Bi3Ag | a | Bi10Sn | 0.4a | 1:1, 2:2, 3:3 | |

● Bi-Ag wire; ● Bi-Sn wire

Figure 9

HYBRID LEAD-FREE SOLDER WIRE

CROSS-REFERENCE TO RELATED APPLICATIONS

This application is a divisional of U.S. patent application Ser. No. 15/076,386 filed on Mar. 21, 2016 and issued as U.S. Pat. No. 9,802,274 on Oct. 31, 2017, which is incorporated herein by reference in its entirety.

TECHNICAL FIELD

The disclosed technology relates generally to lead-free solder wires, and more particularly, some embodiments relate to the compositions of each alloy constituent in lead-free solder wires for high temperature solder joint applications.

BACKGROUND

High lead solders are high temperature solders that are often used to keep the internal connections of an electrical device properly positioned and stationed on a printing wire board (PWB). However, when the electronic devices containing lead solders are disposed, the lead from the lead solders still remains, which is considered to be hazardous to the environment and human health. As a result, stricter regulations increasingly prohibit the use of Pb-bearing solders in the electronic interconnection and the electronic packaging industries. Thus, Pb-free solders are widely being investigated as an alternative substitute to replace the traditional eutectic Pb—Sn solders. For example, SnAg, SnCu, SnAgCu and SnZn solders are now becoming the mainstream Pb—Sn alternatives for use within the semiconductor and electronics industries. However, the development of high temperature Pb-free solders that are appropriate for substituting conventional lead-rich (or the so-called high lead) ones, such as Pb-5Sn & Pb-5Sn-2.5Ag, are still in its infancy.

A common application of high temperature solders is often utilized to achieve die-attach, which is also known as die-bonding. In an exemplary process, an assembly is formed by soldering a silicon die onto a lead-frame using the high temperature solder. Then, the silicon die/lead-frame assembly, which may or may not be encapsulated, is attached onto the PWB by soldering or mechanical fastening. The PWB may then be further exposed to a few more reflow processes for surface mounting with other electronic devices. During the entire process, the internal connections between the silicon die and the lead-frame should be well maintained. To do so, this requires that the high temperature solder resist the multiple reflows without any functional failure. As such, the major requirements for high temperature solders include: (i) a sufficiently high melting temperature around 260° C. and above (in accordance with typical solder reflow profiles), (ii) the ability to achieve sufficient thermal fatigue resistance, (iii) high thermal/electric conductivity, and (iv) low manufacturing costs.

Currently, there are no drop-in lead-free solder alternatives that are available for high temperature solder use. While Bi—Ag alloys have a solidus temperature of 262° C. and thus satisfies the high melting temperature requirement for die-attach solders, there are a few major concerns with the use of such Bi—Ag alloys. For example, Bi—Ag alloys characteristically experience poor wetting on various surface finishes due to its weak bonding interface. As a result, Bi—Ag alloys are a poor choice for solder joint applications.

Additionally, while Sn-based alloys have good reaction chemistry with commonly used surface finish materials such as Cu/Ag/Ni/Au, alloying Sn into Bi—Ag is not ideal because it often leads to poor results. For example, alloying Sn into Bi—Ag will either result in poor wetting when insufficient amounts of Sn are alloyed, or result in a low melting point temperature of the Bi—Sn alloys when excess amounts of Sn are alloyed. This is largely due to the fact that Sn in the Bi—Ag alloy will form Ag3Sn in the intermetallic phases. During reflow, Ag3Sn will then have to dissolve back to the molten Bi matrix to release the free Sn. Thus, the free Sn will diffuse to the interface and react with surface finish materials for wetting. However, in most cases, the de-wetting of the molten Bi matrix occurs earlier than the occurrence of the free Sn being released, which leads to poor wetting capabilities. On the other hand, if there are too many Sn being alloyed, the excess Sn will form the low melting Bi—Sn phases, which again, also leads to an undesirable result since the low melting Bi—Sn will cause the material to lose its high temperature performance capabilities.

BRIEF SUMMARY OF EMBODIMENTS OF THE INVENTION

In view of the above drawbacks, there exists a long felt need for a lead-free solder wire that is designed to deliver both the desired benefits of high temperature performance and good wetting behavior. The present invention claims a new technology for designing and preparing a lead-free solder wire, which delivers the combined merits from two or more constituent alloy portions, such that the combined merits include improved wetting performance, well-controlled IMC layer thickness, enhanced reliability associated with the controlled IMC layer thickness, and good thermal/electrical conductivity.

More specifically, the invented technology provides a method of preparing a hybrid lead-free solder wire that includes a core wire composed of a first alloy and a coating shell composed of a second alloy to be applied over the core wire. The first alloy of the core wire may be selected based on its ability to provide a high melting temperature, good mechanical properties, and acceptable thermal/electrical conductivity. The second alloy of the coating shell may be selected based on its ability to provide improved reaction chemistry to the various surface finish materials of the bonding target, control the IMC formation along the bonding interface, and enhance the bonding strength without harming or interfering with the high temperature performance of the core wire.

In some embodiments, the hybrid lead-free solder wire may be manufactured by dipping the core wire composed of the first alloy into a molten coating material bath composed of the second alloy. In other embodiments, the hybrid lead-free solder wire may be manufactured by electroplating the core wire composed of the first alloy into the coating shell material solution composed of the second alloy. The desired coating layer thickness relative to the core wire diameter may be a crucial factor when controlling both the high temperature performance and the improved wetting behavior of the hybrid lead-free solder wire.

In other embodiments, the hybrid lead-free solder wire may be formed by braiding multiple alloy wires, where each alloy wire may have varied compositions and gauge sizes. By way of example only, the first wire may be composed of a first alloy selected to provide a high melting temperature, good mechanical properties, and acceptable thermal/electrical conductivity. By way of another example, the second wire may be composed of a second alloy selected to provide improved reaction chemistry to the surface finish material of the bonding target, control the IMC formation along the bonding interface, and enhance the bonding strength of the IMC formation without harming the high temperature performance of the first or any other wire. The first alloy wire and the second alloy wire may then be braided together to from a single hybrid lead-free solder wire. The combined merits of the alloy compositions may then deliver both high temperature performance and good wetting behavior.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 9 is a table that describes various different braided solder wire rope with a first alloy wire and a second alloy wire braided in a particular exemplary pattern.

Figure 1:
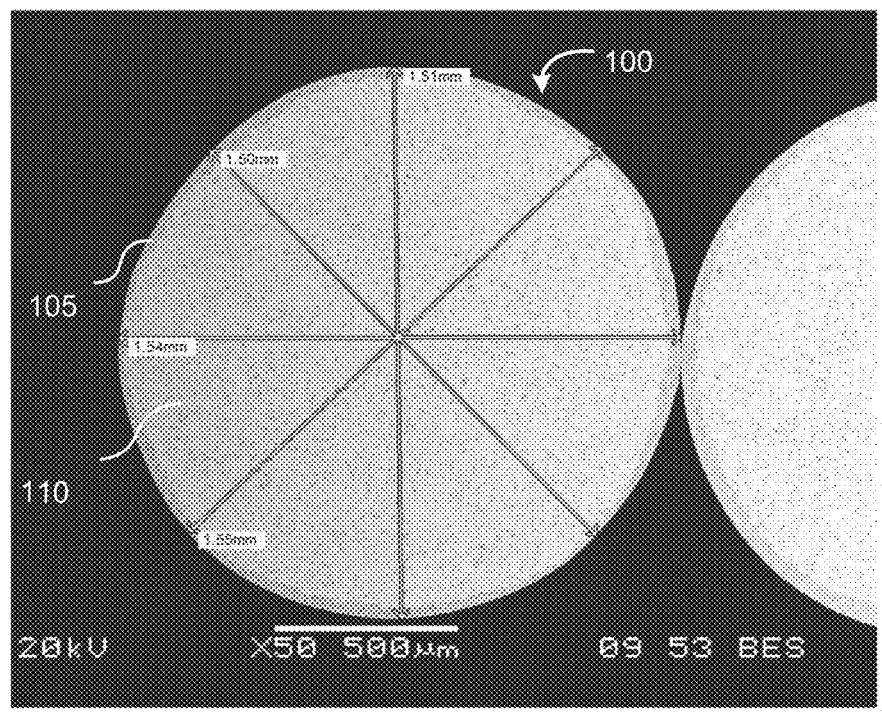
FIG. 1 illustrates a cross-structure view of a core-shell solder wire with a core wire composed of a first alloy BiAg and a shell coating layer composed of second alloy Bi-42Sn, in accordance with certain aspects of the present disclosure.

The figures are not intended to be exhaustive or limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed towards a hybrid lead-free solder wire. In one embodiment, two or more alloys or metals are incorporated to form a hybrid lead-free solder wire. In one embodiment, a first solder alloy or metal (the "first alloy") of is incorporated into a core wire, while the second solder alloy or metal (the "second alloy") is selected to be coated onto the core wire, thus forming a core-shell solder wire. In accordance with the embodiments, the core wire composed of the selected first alloy can be extruded or drawn through conventional wiring methods, or any other method as would be appreciated by one ordinarily skilled in the art upon studying the present disclosure. In other instances, the shell coating layer composed of the selected second alloy may be coated or layered onto the core wire by hot-dipping, such that the core wire is immersed into a bath of molten shell coating material. In other instances, the shell coating layer may be electroplated onto the core wire. However, it should be noted that other methods of layering the core wire may be performed as would be appreciated by one ordinarily skilled in the art upon studying the present disclosure.

In some embodiments, the composition of the first alloy of the core-shell solder wire is selected based on its ability to provide the following characteristic qualities: (1) high melting temperature; (2) good mechanical behavior allowing the selected alloy to be made into wires; (3) able to be manipulated during the shell coating layer stage; and (3) acceptable thermal/electrical conductivity.

In some embodiments, the selected composition of the second alloy of the shell coating layer is configured to behave as a low melting alloy designed to control the wetting performance by improving the reaction chemistry. The selection of the second alloy composition may be determined upon its ability to provide the following characteristic qualities: (1) good reaction chemistry with commonly-used surface finish materials of the bonding target; (2) ability to help control the IMC formation along the bonding interface; and (3) fail to adversely affect the performance or qualities of the first alloy of the core wire, while also enhancing the bonding joint strength.

Additionally, the thickness of the shell coating layer composed of the second alloy may be controlled, especially since the shell coating layer thickness may impact the delivery of both high temperature performance and wetting behavior of the shell coating layer. By way of example only, the varying thickness of the shell coating layer may be effectively controlled to bring about the following: (1) improve reaction chemistry on wetting behavior; (2) prevent the occurrence of an excessively low melting phase; and (3) prevent harm to the final product geometric specification. As such, the combination of the wire composed of the first alloy and the shell coating layer composed of the second alloy may provide a core-shell solder wire that is capable of not only for use in high temperature solder joint applications, but also where the alloy compositions in the core-shell solder wire do not negatively impact one another to bring about property loss that are vital for soldering.

In other embodiments, the hybrid lead-free solder wire is formed by braiding multiple solder wires that have different alloy compositions, otherwise known as a solder rope wire.

By way of example only, the multiple individual solder wires may further be configured to include different gauge sizes. One of the solder wires may be composed of a selected alloy with the following characteristics: (1) high melting temperature; (2) good mechanical properties; and (3) acceptable thermal/electrical conductivity. Another solder wire may be included in the solder rope wire, such that the second solder wire is composed of different alloy with the following properties: (1) improved reaction chemistry with the surface finish material of the bonding target; (2) ability to control the IMC formation along the bonding interface; and (3) fail to adversely affect the performance or qualities of the bonding strength without harming the high temperature performance of the other solder wires braided in the solder rope wire.

FIG. 1 illustrates a cross-structure view of a core-shell solder wire 100 with a core wire 110 composed of a first alloy BiAg and a shell coating layer 105 composed of second alloy Bi-42Sn, in accordance with certain aspects of the present disclosure. The first alloy, BiAg does not characteristically display good wetting on commonly-used surface finish materials because of poor reaction chemistry between Bi and the surface finish materials. More specifically, as a result, the Bi—Ag alloy alone would not be sufficient to be used as proper solder material for bonding purposes.

However, including a second alloy Sn, may have great advantages. For example, Sn may be chosen for its superior reaction chemistries over Bi with various substrates. Sn and Bi exhibit a negative mixing enthalpy and form a eutectic phase in a wide composition range, according to the binary phase diagram. Sb and Bi also have a negative mixing enthalpy and finite solubility to each other. During reflow, Sn first forms a Sn-containing IMC layer on the substrate surface and when the temperature then reaches above the melting temperature of BiAg, all the present alloys are then melted. As such, the good affinity between Bi and Sn guarantees good adhesion of the molten Bi on the Sn-containing IMC layer. Additionally, the existence of Ag in the first alloy can convert any extra Sn in Ag3Sn IMCs residing in the solder body. Therefore, there is minimal or no low melting BiSn phase left because Sn is completely consumed by forming the IMC layer between the solder and the metal substrate and Ag3Sn inside the BiAg solder bump.

Figure 2:
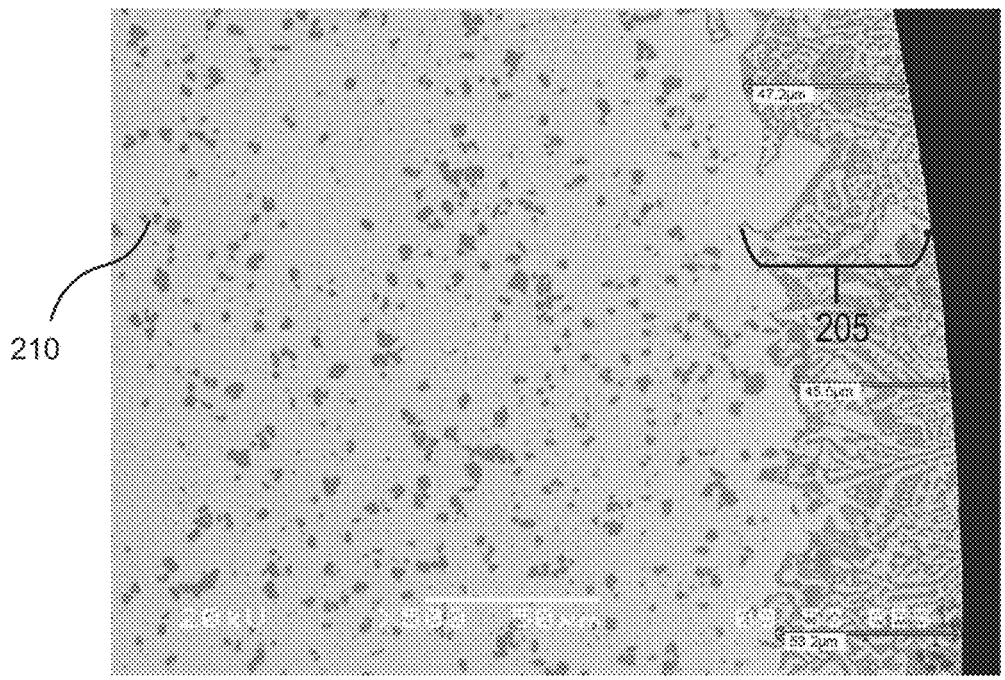
FIG. 2 illustrates a microstructural view of a core-shell solder wire with a core wire composed of a first alloy BiAg and a shell coating layer composed of a second alloy Bi-42Sn, in accordance with certain aspects of the present disclosure.

FIG. 2 illustrates a microstructural view of a core-shell solder wire 200 with a core wire 210 composed of a first alloy BiAg and a shell coating layer 205 composed of a second alloy Bi-42Sn, in accordance with certain aspects of the present disclosure. In one particular embodiment, as illustrated, the shell coating layer 205 may have an average thickness of approximately 45 microns. Additionally, FIG. 2 further illustrates a shell coating layer 205 that is coated onto the core wire 210 via hot dipping the core wire 210 into a molten Bi-20Sn alloy composition.

Because the relative thickness of the shell coating layer 205 may impact the improved reaction chemistry of the wetting behavior and high temperature of the melting phase, the mathematic models have been developed to elaborate the relationship with the relative thickness of the shell coating layer with respect to core-shell solder wire. More specifically, in an example design provided below, the mathematical models elaborate the relationship among the following: (1) core wire diameter "a"; (2) Sn content from shell coating layer (Bi—Sn) "x"; (3) Ag content inside Bi—Ag core wire "y"; and (4) the maximum shell coating layer thickness "t". Such an exemplary model is presented in Table 1 below.

TABLE 1

The relationship of Sn content in Bi-Sn shell "x", Ag content in Bi-Ag core wire "y" and the shell coating layer thickness "t" with the core wire diameter "a" of 30 mil.

|  |  |  | Model 1 | | Model 2 | |
| --- | --- | --- | --- | --- | --- | --- |
| a (mil) | x (Sn %) | y (Ag %) | t (mil) | t (micron) | t (mil) | t (micron) |
| 30 | 100 | 15 | 0.51 | 12.94 | 0.50 | 12.73 |
| 30 | 40 | 15 | 1.06 | 26.81 | 1.02 | 25.93 |
| 30 | 20 | 15 | 2.00 | 50.73 | 1.88 | 47.74 |
| 30 | 5 | 15 | 7.68 | 195.01 | 6.34 | 160.99 |
| 30 | 100 | 11 | 0.37 | 9.46 | 0.37 | 9.35 |
| 30 | 40 | 11 | 0.77 | 19.61 | 0.75 | 19.13 |
| 30 | 20 | 11 | 1.46 | 37.10 | 1.40 | 35.45 |
| 30 | 5 | 11 | 5.61 | 142.61 | 4.84 | 122.81 |
| 30 | 100 | 8 | 0.27 | 6.87 | 0.27 | 6.81 |
| 30 | 40 | 8 | 0.56 | 14.23 | 0.55 | 13.97 |
| 30 | 20 | 8 | 1.06 | 26.92 | 1.02 | 26.03 |
| 30 | 5 | 8 | 4.07 | 103.50 | 3.63 | 92.31 |

Additionally, Table 2 describes the relationship of Sn content in a Bi—Sn shell coating layer, Ag content in Bi—Ag core wire, and the shell coating layer thickness with the core wire diameter of 20 mil.

TABLE 2

The relationship of Sn content in Bi-Sn shell coating layer "x", Ag content in Bi-Ag core wire "y", and the shell coating layer thickness "t" with the core wire diameter "a" of 20 mil.

|  |  |  | Model 1 | | Model 2 | |
| --- | --- | --- | --- | --- | --- | --- |
| a (mil) | x (Sn %) | y (Ag %) | t (mil) | t (micron) | t (mil) | t (micron) |
| 20 | 100 | 15 | 0.34 | 8.63 | 0.33 | 8.48 |
| 20 | 40 | 15 | 0.70 | 17.87 | 0.68 | 17.29 |
| 20 | 20 | 15 | 1.33 | 33.82 | 1.25 | 31.82 |
| 20 | 5 | 15 | 5.12 | 130.01 | 4.23 | 107.33 |
| 20 | 100 | 11 | 0.25 | 6.31 | 0.25 | 6.23 |
| 20 | 40 | 11 | 0.51 | 13.07 | 0.50 | 12.75 |
| 20 | 20 | 11 | 0.97 | 24.73 | 0.93 | 23.63 |
| 20 | 5 | 11 | 3.74 | 95.07 | 3.22 | 81.88 |
| 20 | 100 | 8 | 0.18 | 4.58 | 0.18 | 4.54 |
| 20 | 40 | 8 | 0.37 | 9.49 | 0.37 | 9.32 |
| 20 | 20 | 8 | 0.71 | 17.95 | 0.68 | 17.36 |
| 20 | 5 | 8 | 2.72 | 69.00 | 2.42 | 61.54 |

Tables 1 and 2 highlight in detail the exemplary relationship of the relative thickness of the shell coating layer with respect to the compositions of the first alloy and second alloy, such that favorable chemical properties of the alloys still provide general improved reaction chemistry of the wetting behavior and high temperature of the melting phase.

Figure 3:
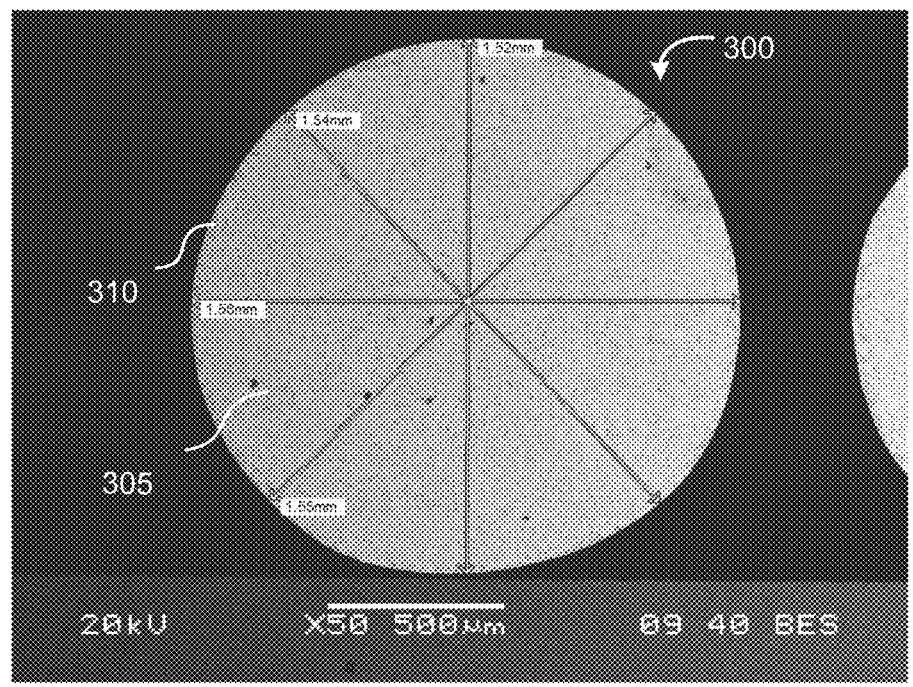
FIG. 3 illustrates a cross-structure view of a core-shell wire with a core wire composed of a first alloy BiAg and a shell coating layer composed of a second alloy Bi-20Sn, in accordance with certain aspects of the present disclosure.
Figure 4:
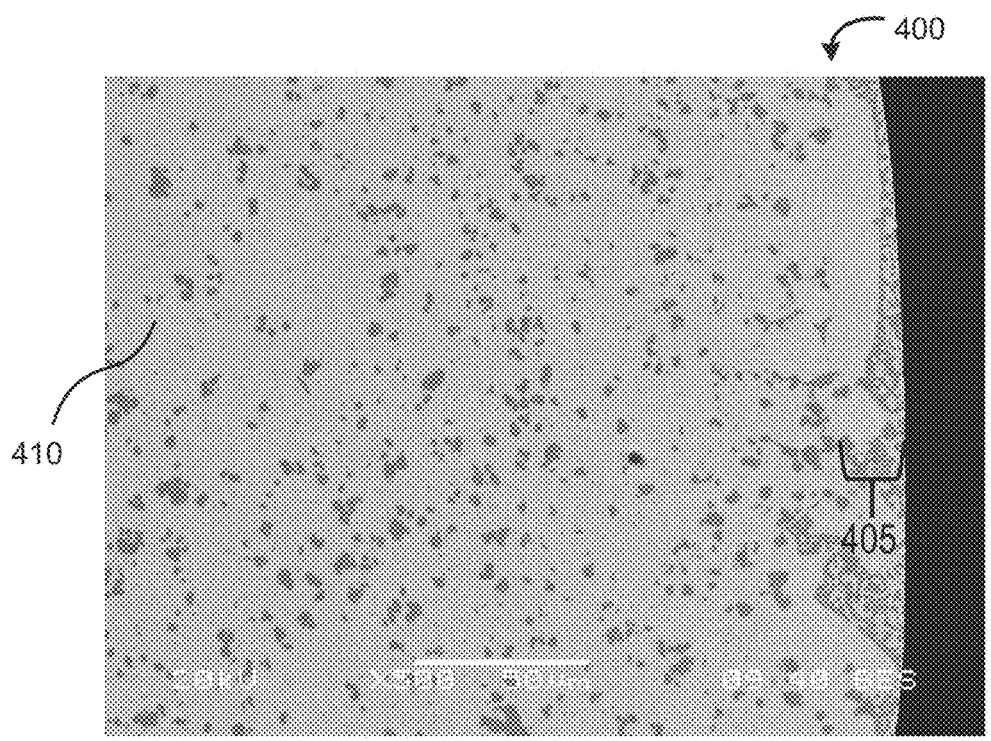
FIG. 4 illustrates a microstructural view of a core-shell solder wire with a core wire composed of a first alloy BiAg and a shell coating layer composed of a second alloy Bi-42Sn, in accordance with certain aspects of the present disclosure.

FIG. 3 illustrates a cross-structure view of a core-shell solder wire 300 with a core wire 305 composed of a first alloy Bi-11Ag and a shell coating layer 310 composed of a second alloy Bi-20Sn, in accordance with certain aspects of the present disclosure. FIG. 4 illustrates a microstructural view of a core-shell solder wire 400 with a core wire 410 composed of a first alloy Bi-11Ag and a shell coating layer 405 composed of a second alloy Bi-42Sn, in accordance with certain aspects of the present disclosure. As illustrated, by way of example only, the shell coating layer 405 has an average coating layer thickness of 15 microns. Additionally, FIG. 4 further illustrates a shell coating layer 405 that is coated onto the core wire 210 via hot dipping the core wire 210 into the Bi-20Sn alloy composition.

Figure 5:
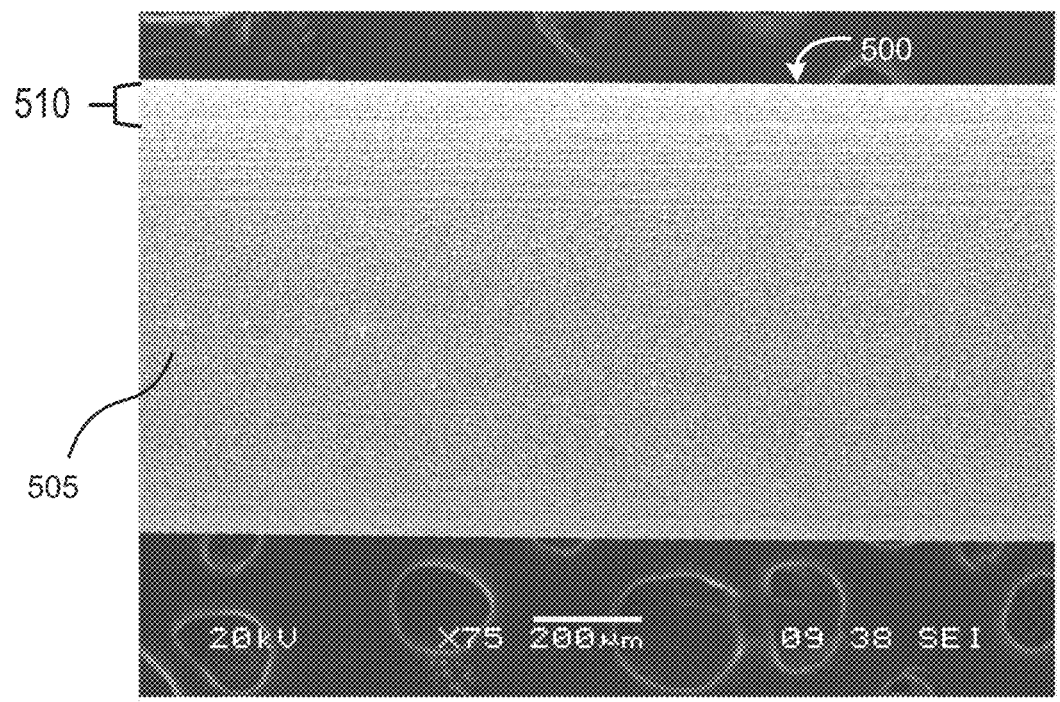
FIG. 5 illustrates a microstructural view of a core-shell solder wire with a core wire composed of a first alloy Bi-11Ag and a shell coating layer composed of a second alloy Sn, in accordance with certain aspects of the present disclosure.
Figure 6:
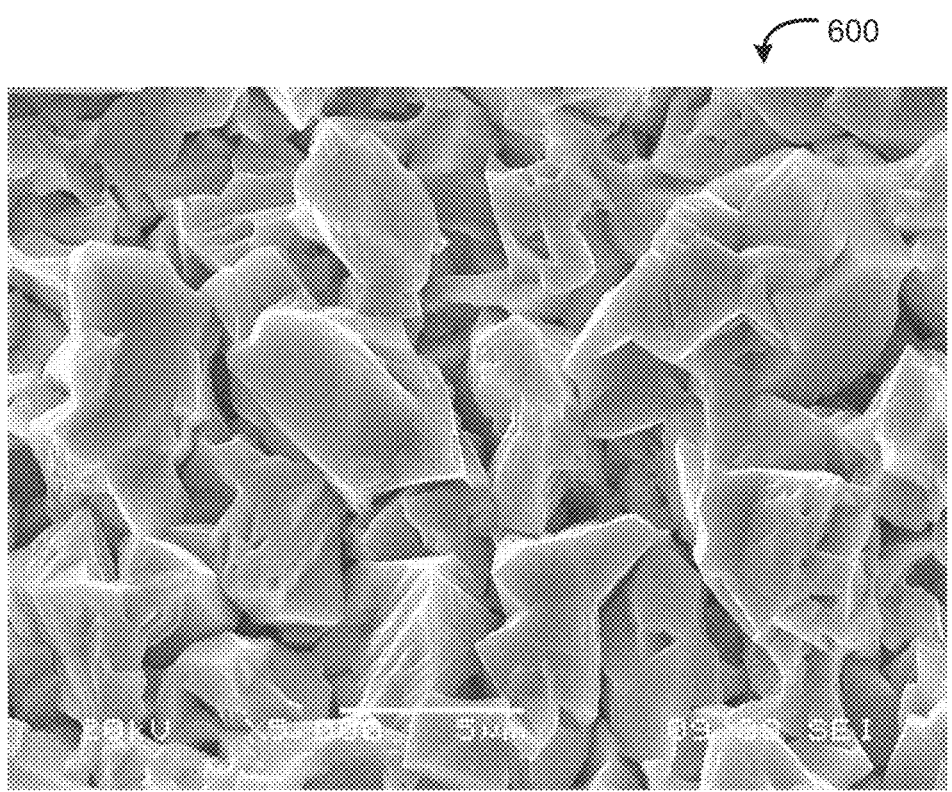
FIG. 6 illustrates a microstructural view of the shell coating layer composed of Sn metal, in accordance with certain aspects of the present disclosure.
Figure 7:
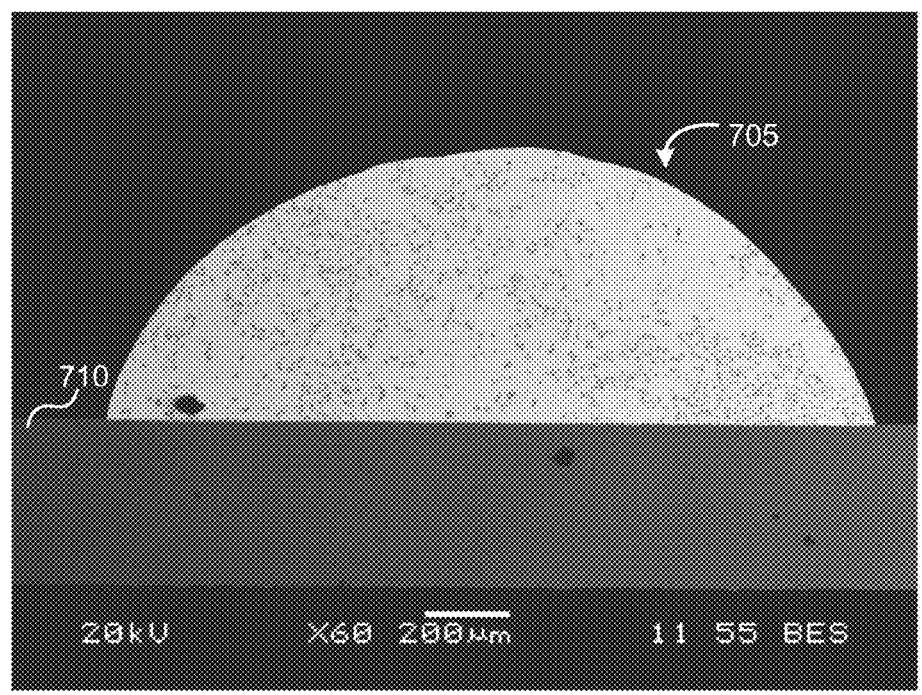
FIG. 7 illustrates the wetting behavior of the core-shell wire on a Cu substrate, in accordance with certain aspects of the present disclosure.
Figure 8:
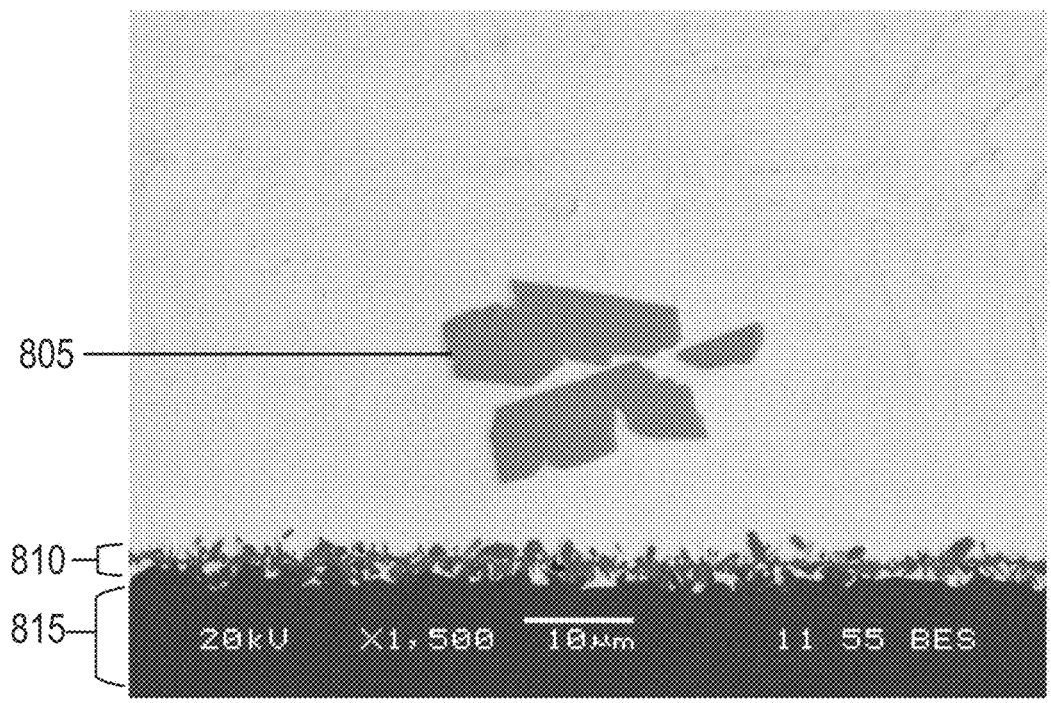
FIG. 8 illustrates a microstructural view of an interfacial IMC between a solder and a Cu substrate, in accordance with certain aspects of the present disclosure.

FIG. 5 illustrates a microstructural view of a core-shell solder wire 500 with a core wire 505 composed of a first alloy Bi-11Ag and a shell coating layer 510 composed of a second alloy Sn, in accordance with certain aspects of the present disclosure. Here, by way of example only, the shell coating layer is electroplated onto the core wire with an average coating layer thickness of around 8 microns. FIG. 6 then illustrates a microstructural view of the shell coating layer 600 composed of Sn metal, in accordance with certain aspects of the present disclosure FIG. 7 illustrates the wetting behavior of the core wire 705 on a Cu substrate 710, in accordance with certain aspects of the present disclosure. Additionally, FIG. 8 illustrates a microstructural view of an interfacial IMC 810 between a solder joint 805 and a Cu substrate 815. Here, during reflow, the temperature of the assembly rises above the selected second alloy, which then melts and spreads all over the Cu substrate 815 and around the still solid selected first alloy particles. The superior surface reaction chemistry of the second alloy will facilitate the wetting of the molten second alloy on the Cu substrate 815. Accordingly, the IMC layer 810 is controlled by the compound characteristics of the second alloy.

Additionally, the second alloy is designed to have good affinity to the first alloy. This affinity may be determined by the negative mixing enthalpy between the first alloy and the second alloy, or the formation of the eutectic phase composed of the constituent elements from the first and second alloys. In some embodiments, this affinity results in some of the first alloy dissolving into the already molten second alloy to form a mixture of the first and second alloys.

As the temperature rises above the first alloy's melting temperature, the first alloy finishes melting and thus forms a solution of the first and second alloys, which wets to the IMC layer 810. In some embodiments, in addition to forming the IMC layer 810, the affinity between the first alloy and the second alloy assists in improving the wetting of the first alloy onto the IMC layer 810, and thereby enhancing the bonding strength. As the assembly is then cooled, a solder bump 805 or joint is formed and bonded to the IMC layer 810. After solidification, a homogenous solder joint with the improved bonding interface has been achieved.

In one embodiment of the invention, a method for designing a core-shell solder wire comprises selecting a first alloy according to a desired trait of a finished solder joint, and then selecting a second alloy in accordance to applicable substrates and affinity with the selected first alloy. For high temperature solder applications, the first alloy may be chosen from various high melting solder alloys. In some embodiments, Bi-rich alloys, whose solidus temperature is around 258° C. and above, i.e. Bi—Ag, Bi—Cu, Bi—Ag—Cu— and Bi—Sb, are used. The second alloys may then be selected from an array of alloys that have shown superior chemistry to wet onto various metallization surface finishes and provide good affinity with molten Bi.

In these embodiments, the second alloy will melt before or together with the Bi-rich alloys, which results in the wetting and adhering onto the provided substrate. Meanwhile, the good affinity between the first alloy comprising Bi systems and the second alloy will provide good wetting. Accordingly, the second alloy comprising Sn and Sn alloys, whose solidus temperature is around 200° C. and 230° C., may include Sn—Ag, Sn—Cu, Sn—Ag—X (X=Al, Au, Bi, Co, Cu, Ga, Ge, Ge, In, Mn, Ni, P, Pd, Pt, Sb, and Zn) and Sn—Zn alloys, etc. Additionally, another group of second alloys may include solder alloys with solidus temperature lower than 200° C., i.e. Sn—Bi, Sn—In, Bi—In, In—Cu, In—Ag and In—Ag—X (X=Al, Au, Bi, Co, Cu, Ga, Ge, Mn, Ni, P, Pd, Pt, Sb, Sn and Zn), Sn—Bi—X (X=Ag, Al, Au, Co, Cu, Ga, Ge, In, Mn, Ni, P, Pd, Pt, Sb, or Zn), Sn—In—X (X=Ag, Al, Au, Bi, Co, Cu, Ga, Ge, Mn, Ni, P, Pd, Pt, Sb, or Zn), and Bi—In—X (X=Ag, Al, Au, Co, Cu, Ga, Ge, Mn, Ni, P, Pd, Pt, Sb, or Zn) alloys etc. In these alloys, Sn and/or In is the reactive agent in the system.

In one embodiment of the invention, the first alloy of the core wire comprises Bi—Ag and has a solidus temperature of around 260° C. and above. In a particular embodiment, the first alloy comprises from 0 to 30 wt % Ag with the remainder being Bi. Preferably, the core wire alloy comprises from 2.5 to 16 wt % Ag with the remainder being Bi.

In another embodiment of the invention, the first alloy of the core wire is comprises Bi—Cu and has a solidus temperature of around 270° C. and above. In a particular embodiment, the first alloy comprises from 0 to 5 wt % Cu with the remainder being Bi. Preferably, the core wire alloy comprises from 0.2 to 1.5 wt % of Cu with the remainder being Bi.

In further embodiments of the invention, the first alloy of the core wire comprises Bi—Ag—Cu and has a solidus temperature around 258° C. and above. In a particular embodiment, the first alloy comprises from 0 to 20 wt % Ag and from 0 to 5 wt % Cu with the remainder being Bi. Preferably, the core wire alloy comprises from 2.5 to 16 wt % Ag, and from 0.2 to 1.5 wt % Cu with the remainder being Bi.

In some embodiments of the invention, the first alloy of the core wire comprises Bi—Ag—Cu—X (X=Al, Au, Co, Ga, Ge, In, Mn, Ni, P, Pd, Pt, Sb, Sn, or Zn) and has a solidus temperature around 255° C. and above. In a particular embodiment, the first alloy comprises from 0 to 20 wt % Ag, from 0 to 5 wt % Cu, and from 0 to 5% X with the remainder being Bi. Preferably, the core wire alloy comprises from 0 to 16 wt % Ag, from 0 to 1.5 wt % Cu, and from 0 to 2% X with the remainder being Bi.

In some embodiments of the invention, the first alloy of the core wire comprises Bi—Sb and has a solidus temperature around 270° C. and above. In a particular embodiment, the first alloy comprises from 0 to 20 wt % Sb with the remainder being Bi. Preferably, the core wire alloy comprises from 0 to 10 wt % Sb with the remainder being Bi.

In some embodiments of the invention, the first alloy of the core wire comprises Bi—Sb—X (X=Ag, Al, Au, Co, Cu, Ga, Ge, In, Mn, Ni, P, Pd, Pt, Sb, Sn, or Zn) and has a solidus temperature around 270° C. and above. In a particular embodiment, the first alloy comprises from 0 to 20 wt % Sb, and from 0 to 10% X with the remainder being Bi. Preferably, the core wire alloy comprises from 0 to 10 wt % Sb, and from 0 to 5% X with the remainder being Bi.

Further embodiments of the invention provide methods for making a hybrid lead-free solder wire that combines the merits of distinct and separate alloys. In some embodiments, the core wire is comprised of a first alloy and is then covered with a coating shell layer composed of a second alloy.

In some embodiments, the second alloy of the shell coating layer comprises Sn metal and has a solidus temperature around 231° C. and above.

In further embodiments, the second alloy of the shell coating layer comprises Sn—Ag and has a solidus temperature around 221° C. and above. In a particular embodiment, the second alloy comprises from 0 to 10 wt % Ag with the remainder being Sn. Preferably, the second alloy comprises from 0 to 5 wt % Ag with the remainder being Sn.

In further embodiments, the second alloy of the shell coating layer comprises Sn—Cu and has a solidus temperature around 227° C. and above. In a particular embodiment, the second alloy comprises from 0 to 5 wt % Cu with the remainder being Sn. Preferably, the second alloy comprises from 0 to 2 wt % Cu with the remainder being Sn.

In a particular embodiment, the second alloy of the shell coating layer comprises Sn—Ag—Cu and has a solidus temperature around 217° C. and above. In a particular embodiment, the second alloy comprises from 0 to 10% Ag, and from 0 to 5 wt % Cu with the remainder being Sn. Preferably, the second alloy comprises from 0 to 5% Ag and from 0 to 2 wt % Cu with the remainder being Sn.

In other embodiments, the second alloy of the shell coating layer comprises Sn—Ag—Cu—X (X=Al, Au, Bi, Co, Ga, Ge, In, Mn, Ni, P, Pd, Pt, Sb, or Zn) and has a solidus temperature around 200° C. and above. In a particular embodiment, the second alloy comprises from 0 to 10 wt % Ag, from 0 to 5% Cu and from 0 to 5 wt % X with the remainder being Sn. Preferably, the second alloy comprises from 0 to 5 wt % Ag, from 0 to 2 wt % Cu and 0 to 2% X with the remainder being Sn.

In some embodiments, the second alloy of the shell coating layer comprises Sn—Zn and has a solidus temperature around 190° C. and above. In a particular embodiment, the second alloy comprises from 0 to 20 wt % Zn with the remainder being Sn. Preferably, the second alloy comprises from 1 to 11 wt % Zn with the remainder being Sn.

In some embodiments, the second alloy of the shell coating layer comprises Bi—Sn and has a solidus temperature around 100° C. and above. In a particular embodiment, the second alloy comprises from 2 to 60 wt % Sn with the remainder being Bi. Preferably, the second alloy comprises from 2 to 42 wt % Sn with the remainder being Bi.

In other embodiments, the second alloy of the shell coating layer comprises Bi—Sn—X (X=Ag, Al, Au, Co, Cu, Ga, Ge, In, Mn, Ni, P, Pd, Pt, Sb, or Zn) and has a solidus temperature around 100 and around 200° C. In a particular embodiment, the second alloy comprises from 2 to 50 wt % Sn, from 0 to 30% X with the remainder being Bi. Preferably, the second alloy comprises from 2 to 42 wt % Sn, from 0 to 5% X with the remainder being Bi.

In further embodiments, the second alloy of the shell coating layer comprises Sn—In and has a solidus temperature around 100° C. and above. In a particular embodiment, the second alloy comprises from 0 to 50 wt % In with the remainder being Sn. Preferably, the second alloy comprises from 1 to 40 wt % In with the remainder being Sn.

In further embodiments, the second alloy of the shell coating layer comprises Sn—In—X (X=Ag, Al, Au, Bi, Co, Cu, Ga, Ge, Mn, Ni, P, Pd, Pt, Sb, or Zn) and has a solidus temperature around 100 and around 200° C. In a particular embodiment, the second alloy comprises from 0 to 50 wt % In, from 0 to 30% X with the remainder being Sn. Preferably, the second alloy comprises from 1 to 40 wt % In, from 0 to 5% X with the remainder being Sn.

In other embodiments, the second alloy of the shell coating layer comprises Bi—In and has a solidus temperature around 100 and around 200° C. In a particular embodiment, the second alloy comprises from 0 to 50 wt % In with the remainder being Bi. Preferably, the second alloy comprises from 1 to 20 wt % In with the remainder being Bi.

In some embodiments, the second alloy of the shell coating layer comprises Bi—In—X (X=Ag, Al, Au, Co, Cu, Ga, Ge, Mn, Ni, P, Pd, Pt, Sb, or Zn) and has a solidus temperature around 100 and around 200° C. In a particular embodiment, the second alloy comprises from 0 to 50 wt % In, 0 to 30 wt % X with the remainder being In. Preferably, the second alloy comprises from 0 to 20 wt % In, 0 to 5 wt % X with the remainder being Bi.

In some embodiments, the second alloy of the shell coating layer comprises Sn—Sb and has a solidus temperature around at least 230° C. In a particular embodiment, the second alloy comprises from 0 to 50 wt % Sb with the remainder being Sn.

In further embodiments, the second alloy of the shell coating layer comprises Sb—Sb—X (X=Ag, Al, Au, Bi, Co, Cu, Ga, Ge, In, Mn, Ni, P, Pd, Pt, or Zn) and has a solidus temperature around 220° C. and around 250° C. In a particular embodiment, the second alloy comprises from 0 to 50 wt % Sb, 0 to 30 wt % X with the remainder being Sn.

Another embodiment of the present invention is a hybrid lead-free solder wire that is formed by braiding two or more solder wires each composed of different alloys. By way of example only, the solder wires with different alloy compositions may come in varied gauge sizes. The first solder wire may be composed of an alloy with the following chemical and physical properties: high melting temperature, good mechanical properties, and acceptable thermal/electrical conductivity. At least a second wire may be included that is composed of an alloy with the following chemical and physical properties: improved reaction chemistry to the surface finish material of the bonding target, control the IMC formation along the bonding interface, and further enhance the bonding strength without harming the high temperature performance of the first solder wire. The wire compositions and the gauge sizes are designed and configured to deliver both the good high temperature performance and the good wetting performance.

In an example design, FIG. 9 describes various different braided solder wire rope with a first alloy wire and a second alloy wire braided in a particular exemplary pattern.

Each of the braided solder wire rope in FIG. 9 shows exemplary configurations of the first alloy wire comprising Bi—Ag and the second alloy wire comprising Bi—Sn. By way of example only, the braided solder wire rope may include individual alloy wires that are either drawn or extruded from an alloy slug. Each alloy wires with the same or varying gauge size may then be braided together following the pattern examples in FIG. 9.

In one embodiment of the invention, a method for obtaining a braided solder wire rope comprises selecting a first alloy wire according to a desire trait of a finished solder joint, and then selecting a second alloy wire according to applicable substrates and affinity with the selected first alloy. For high temperature solder applications, the first alloy wire may be chosen from various high melting solder alloys. In some embodiments, Bi-rich alloys, whose solidus temperature is around 258° C. and above, i.e. Bi—Ag, Bi—Cu, Bi—Ag—Cu— and Bi—Sb, are used. The second alloy wire may be selected from an array of alloys that have shown superior chemistry to be wetted onto various metallization surface finishes and provide good affinity with the molten Bi.

In these embodiments, the second alloy will melt before or together with the Bi-rich alloys and then easily wet on and adhere to the selected substrate. Meanwhile the good affinity between first alloy wire composed with Bi and the second wire alloy will provide good wetting. Accordingly, the second alloy wire may be composed with Sn and Sn alloys, whose solidus temperature is around 200° C. and 230° C. The Sn alloy systems may include Sn—Ag, Sn—Cu, Sn—Ag—X (X=Al, Au, Bi, Co, Cu, Ga, Ge, Ge, In, Mn, Ni, P, Pd, Pt, Sb, and Zn), Sn—Zn, Bi—Sn, Sn—In, Sn—Sb alloys, etc. Additionally, another group of alloys for the second alloy wire may include solder alloys with solidus temperature lower than 200° C., i.e. Sn—Bi, Sn—In, Bi—In, In—Cu, In—Ag and In—Ag—X (X=Al, Au, Bi, Co, Cu, Ga, Ge, Mn, Ni, P, Pd, Pt, Sb, Sn and Zn), Sn—Bi—X (X=Ag, Al, Au, Co, Cu, Ga, Ge, In, Mn, Ni, P, Pd, Pt, Sb, or Zn), Sn—In—X (X=Ag, Al, Au, Bi, Co, Cu, Ga, Ge, Mn, Ni, P, Pd, Pt, Sb, or Zn), and Bi—In—X (X=Ag, Al, Au, Co, Cu, Ga, Ge, Mn, Ni, P, Pd, Pt, Sb, or Zn) alloys etc. In these wire alloys, Sn and/or In is the reactive agent in the system.

In one embodiment, the first wire alloy of the braided solder wire rope comprises Bi—Ag and has a solidus temperature of around 260° C. and above. In a particular embodiment, the first wire alloy comprises from 0 to 30 wt % Ag with the remainder being Bi. Preferably, the first wire alloy comprises from 2.5 to 16 wt % Ag with the remainder being Bi.

In another embodiment, the first wire alloy of the braided solder wire rope comprises Bi—Cu and has a solidus temperature of around 270° C. and above. In a particular embodiment, the first wire alloy comprises from 0 to 5 wt % Cu with the remainder being Bi. Preferably, the first wire alloy comprises from 0.2 to 1.5 wt % of Cu with the remainder being Bi.

In some embodiments, the first wire alloy of the braided solder wire rope comprises Bi—Ag—Cu and has a solidus temperature around 258° C. and above. In a particular embodiment, the first wire alloy comprises from 0 to 20 wt % Ag and from 0 to 5 wt % Cu with the remainder being Bi. Preferably, the first wire alloy comprises from 2.5 to 16 wt % Ag, and from 0.2 to 1.5 wt % Cu with the remainder being Bi.

In further embodiments, the first wire alloy of the braided solder wire rope comprises Bi—Ag—Cu—X (X=Al, Au, Co, Ga, Ge, In, Mn, Ni, P, Pd, Pt, Sb, Sn, or Zn) and has a solidus temperature around 255° C. and above. In a particular embodiment, the first wire alloy comprises from 0 to 20 wt % Ag, from 0 to 5 wt % Cu, and from 0 to 5% X with the remainder being Bi. Preferably, the first wire alloy comprises from 0 to 16 wt % Ag, from 0 to 1.5 wt % Cu, and from 0 to 2% X with the remainder being Bi.

In other embodiments, the first wire alloy of the braided solder wire rope comprises Bi—Sb and has a solidus temperature around 270° C. and above. In a particular embodiment, the first wire alloy comprises from 0 to 20 wt % Sb with the remainder being Bi. Preferably, the first wire alloy comprises from 0 to 10 wt % Sb with the remainder being Bi.

In yet other embodiments of the invention, the first wire alloy of the braided solder wire rope comprises Bi—Sb—X (X=Ag, Al, Au, Co, Cu, Ga, Ge, In, Mn, Ni, P, Pd, Pt, Sb, Sn, or Zn) and has a solidus temperature around 270° C. and above. In a particular embodiment, the first wire alloy comprises from 0 to 20 wt % Sb, and from 0 to 10% X with the remainder being Bi. Preferably, the first wire alloy comprises from 0 to 10 wt % Sb, and from 0 to 5% X with the remainder being Bi.

In some embodiments, the second wire alloy of the braided solder wire rope comprises Sn metal and has a solidus temperature around 231° C. and above.

In further embodiments, the second wire alloy of the braided solder wire comprises Sn—Ag and has a solidus temperature around 221° C. and above. In a particular embodiment, the second wire alloy comprises from 0 to 10 wt % Ag with the remainder being Sn. Preferably, the second wire alloy comprises from 0 to 5 wt % Ag with the remainder being Sn.

In some embodiments, the second wire alloy of the braided solder wire rope comprises Sn—Sb and has a solidus temperature around 230° C. and above. In a particular embodiment, the second wire alloy comprises from 0 to 20 wt % Sb with the remainder being Sn. In a particular embodiment, the second wire alloy comprises from 0 to 5 wt % Sb with the remainder being Sn.

In some embodiments, the second wire alloy of the braided solder wire rope comprises Sn—Sb—X (X=Al, Au, Bi, Co, Ga, Ge, In, Mn, Ni, P, Pd, Pt, or Zn) and has a solidus temperature around 230° C. and above. In a particular embodiment, the second wire alloy comprises from 0 to 20 wt % Sb and from 0 to 5 wt % X with the remainder being Sn. In a particular embodiment, the second wire alloy comprises from 0 to 5 wt % Sb and 0 to 2 wt % X with the remainder being Sn.

In other embodiments, the second wire alloy of the braided solder wire rope comprises Sn—Cu and has a solidus temperature around 227° C. and above. In a particular embodiment, the second wire alloy comprises from 0 to 5 wt % Cu with the remainder being Sn. Preferably, the second wire alloy comprises from 0 to 2 wt % Cu with the remainder being Sn.

In a particular embodiment, the second wire alloy of the braided solder wire rope comprises Sn—Ag—Cu and has a solidus temperature around 217° C. and above. In a particular embodiment, the second wire alloy comprises from 0 to 10% Ag, and from 0 to 5 wt % Cu with the remainder being Sn. Preferably, the second wire alloy comprises from 0 to 5% Ag and from 0 to 2 wt % Cu with the remainder being Sn.

In other embodiments, the second wire alloy of the braided solder wire rope comprises Sn—Ag—Cu—X (X=Al, Au, Bi, Co, Ga, Ge, In, Mn, Ni, P, Pd, Pt, Sb, or Zn) and has a solidus temperature around 200° C. and above. In a particular embodiment, the second wire alloy comprises from 0 to 10 wt % Ag, from 0 to 5% Cu and from 0 to 5 wt % X with the remainder being Sn. Preferably, the second wire alloy comprises from 0 to 5 wt % Ag, from 0 to 2 wt % Cu and 0 to 2% X with the remainder being Sn.

In some embodiments, the second wire alloy of the braided solder wire rope comprises Sn—Zn and has a solidus temperature around 190° C. and above. In a particular embodiment, the second wire alloy comprises from 0 to 20 wt % Zn with the remainder being Sn. Preferably, the second wire alloy comprises from 1 to 11 wt % Zn with the remainder being Sn.

In some embodiments, the second wire alloy of the braided solder wire rope comprises Bi—Sn and has a solidus temperature around 100° C. and above. In a particular embodiment, the second wire alloy comprises from 2 to 60 wt % Sn with the remainder being Bi. Preferably, the second wire alloy comprises from 2 to 42 wt % Sn with the remainder being Bi.

In other embodiments, the second wire alloy of the braided solder wire rope comprises Bi—Sn—X (X=Ag, Al, Au, Co, Cu, Ga, Ge, In, Mn, Ni, P, Pd, Pt, Sb, or Zn) and has a solidus temperature around 100 and around 200° C. In a particular embodiment, the second wire alloy comprises from 2 to 50 wt % Sn, from 0 to 30% X with the remainder being Bi. Preferably, the second wire alloy comprises from 2 to 42 wt % Sn, from 0 to 5% X with the remainder being Bi.

In further embodiments, the second wire alloy of the braided solder wire rope comprises Sn—In and has a solidus temperature around 100° C. and above. In a particular embodiment, the second wire alloy comprises from 0 to 50 wt % In with the remainder being Sn. Preferably, the second wire alloy comprises from 1 to 40 wt % In with the remainder being Sn.

In other embodiments, the second wire alloy of the braided solder wire rope comprises Sn—In—X (X=Ag, Al, Au, Bi, Co, Cu, Ga, Ge, Mn, Ni, P, Pd, Pt, Sb, or Zn) and has a solidus temperature around 100 and around 200° C. In a particular embodiment, the second wire alloy comprises from 0 to 50 wt % In, from 0 to 30% X with the remainder being Sn. Preferably, the second wire alloy comprises from 1 to 40 wt % In, from 0 to 5% X with the remainder being Sn.

In some embodiments, the second wire alloy of the braided solder wire rope comprises Sn—Sb and has a solidus temperature around at least 230° C. In a particular embodiment, the second wire alloy comprises from 0 to 50 wt % Sb with the remainder being Sn.

In further embodiments, the second wire alloy of the braided solder wire rope comprises Sb—Sb—X (X=Ag, Al, Au, Bi, Co, Cu, Ga, Ge, In, Mn, Ni, P, Pd, Pt, or Zn) and has a solidus temperature around 220° C. and around 250° C. In a particular embodiment, the second wire alloy comprises from 0 to 50 wt % Sb, 0 to 30 wt % X with the remainder being Sn.

In other embodiments, the second wire alloy of the braided solder wire rope comprises Bi—In and has a solidus temperature around 100 and around 200° C. In a particular embodiment, the second wire alloy comprises from 0 to 50 wt % In with the remainder being Bi. Preferably, the second wire alloy comprises from 1 to 20 wt % In with the remainder being Bi.

In other embodiments, the second wire alloy of the braided solder wire rope comprises Bi—In—X (X=Ag, Al, Au, Co, Cu, Ga, Ge, Mn, Ni, P, Pd, Pt, Sb, or Zn) and has a solidus temperature around 100 and around 200° C. In a particular embodiment, the second wire alloy comprises from 0 to 50 wt % In, 0 to 30 wt % X with the remainder being In. Preferably, the second wire alloy comprises from 0 to 20 wt % In, 0 to 5 wt % X with the remainder being Bi.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A braided solder wire rope comprising:
a first wire composed of a first alloy comprising: Bi—Ag, Bi—Cu, Bi—Ag—Cu, Bi—Sb, Bi—Sb—X (where X=Ag, Al, Au, Co, Cu, Ga, Ge, In, Mn, Ni, P, Pd, Pt, Sb, Sn, Zn), or Bi—Ag—Cu—X (where X=Al, Au, Co, Ga, Ge, In, Mn, Ni, P, Pd, Pt, Sb, Sn, or Zn); and a second wire composed of a second alloy or metal comprising: Sn, Sn—Sb, Sn—Ag, Sn—Cu, Sn—Ag—Cu, Sn—Zn, Sn—Bi, Sn—In, Bi—In, Bi—Sn, Sn—Ag—Cu—X (where X=Al, Au, Bi, Co, Ga, Ge, In, Mn, Ni, P, Pd, Pt, Sb, or Zn), Bi—Sn—X (X=Ag, Al, Au, Co, Cu, Ga, Ge, In, Mn, Ni, P, Pd, Pt, Sb, or Zn), Sn—In—X (X=Ag, Al, Au, Bi, Co, Cu, Ga, Ge, Mn, Ni, P, Pd, Pt, Sb, or Zn), Sn—Sb—X (X=Ag, Al, Au, Bi, Co, Cu, Ga, Ge, In, Mn, Ni, P, Pd, Pt, or Zn), or Bi—In—X (X=Ag, Al, Au, Co, Cu, Ga, Ge, Mn, Ni, P, Pd, Pt, Sb, or Zn);

wherein the first alloy has a solidus temperature of around 258° C. and above;

wherein the first wire and the second wire are braided together.

2. The braided solder wire rope of claim 1, wherein the first alloy comprises Bi—Ag that comprises from greater than 0 to 30 wt % Ag with the remainder being Bi, such that the first alloy has a solidus temperature of around 260° C. and above.

3. The braided solder wire rope of claim 1, wherein the first alloy comprises Bi—Cu that comprises from greater than 0 to 5 wt % Cu with the remainder being Bi, such that the first alloy has a solidus temperature of around 270° C. and above.

4. The braided solder wire rope of claim 1, wherein the first alloy comprises Bi—Ag—Cu that comprises from greater than 0 to 20 wt % Ag and greater than 0 to 5 wt % Cu with the remainder being Bi, such that the first alloy has a solidus temperature of around 285° C. and above.

5. The braided solder wire rope of claim 1, wherein the first alloy comprises Bi—Ag—Cu—X (where X=Al, Au, Co, Ga, Ge, In, Mn, Ni, P, Pd, Pt, Sb, Sn, or Zn) that comprises from greater than 0 to 20 wt % Ag, greater than 0 to 5 wt % Cu, and from greater than 0 to 5 wt % X with the remainder being Bi, such that the first alloy has a solidus temperature of around 255° C. and above.

6. The braided solder wire rope of claim 1, wherein the first alloy comprises Bi—Sb that comprises from greater than 0 to 20 wt % Sb with the remainder being Bi, such that the first alloy has a solidus temperature of around 270° C. and above.

7. The braided solder wire rope of claim 1, wherein the first alloy comprises Bi—Sb—X (where X=Ag, Al, Au, Co, Cu, Ga, Ge, In, Mn, Ni, P, Pd, Pt, Sb, Sn, Zn) that comprises from greater than 0 to 20 wt % Sb and greater than 0 to 10 wt % X with the remainder being Bi, such that the first alloy has a solidus temperature of around 270° C. and above.

8. The braided solder wire rope of claim 1, wherein the second alloy or metal has a solidus temperature of 231° C. or higher.

9. The braided wire of claim 1, wherein the second alloy or metal comprises Sn—Sb that comprises from greater than 0 to 20 wt % Sb with the remainder being Sn, such that the second alloy has a solidus temperature of 230° C. and above.

10. The braided solder wire rope of claim 1, wherein the second alloy or metal comprises Sn—Ag that comprises from greater than 0 to 10 wt % Ag with the remainder being Sn, such that the second alloy has a solidus temperature of around 221° C. and above.

11. The braided solder wire rope of claim 1, wherein the second alloy or metal comprises Sn—Cu that comprises from greater than 0 to 5 wt % Cu with the remainder being Sn, such that the second alloy has a solidus temperature of 227° C. and above.

12. The braided solder wire rope of claim 1, wherein the second alloy or metal comprises Sn—Ag—Cu that comprises from greater than 0 to 10% Ag, greater than 0 to 5 wt % Cu with the remainder being Sn, such that the second alloy has a solidus temperature of 217° C. and above.

13. The braided solder wire rope of claim 1, wherein the second alloy or metal comprises Sn—Ag—Cu—X (where X=Al, Au, Bi, Co, Ga, Ge, In, Mn, Ni, P, Pd, Pt, Sb, or Zn) that comprises from greater than 0 to 10 wt % Ag, greater than 0 to 5 wt % Cu, and greater than 0 to 5 wt % X with the remainder being Sn, such that the second alloy has a solidus temperature of 200° C. and above.

14. The braided solder wire rope of claim 1, wherein the second alloy or metal comprises Sn—Zn that comprises from greater than 0 to 20 wt % Zn with the remainder being Sn, such that the second alloy has a solidus temperature of around 190° C. and above.

15. The braided solder wire rope of claim 1, wherein the second alloy or metal comprises Bi—Sn that comprises from 2 to 60 wt % Sn with the remainder being Bi, such that the second alloy has a solidus temperature of around 100° C. and above.

16. The braided solder wire rope of claim 1, wherein the second alloy or metal comprises Bi—Sn—X (X=Ag, Al, Au, Co, Cu, Ga, Ge, In, Mn, Ni, P, Pd, Pt, Sb, or Zn) that comprises from 2 to 50 wt % Sn and greater than 0 to 30 wt % X with the remainder being Bi, such that the second alloy has a solidus temperature of around 200° C. and above.

17. The braided solder wire rope of claim 1, wherein the second alloy or metal comprises Sn—In that comprises from greater than 0 to 50 wt % In with the remainder being Sn, such that the second alloy has a solidus temperature of around 100° C. and above.

18. The braided solder wire rope of claim 1, wherein the second alloy or metal comprises Sn—In—X (X=Ag, Al, Au, Bi, Co, Cu, Ga, Ge, Mn, Ni, P, Pd, Pt, Sb, or Zn) that comprises from greater than 0 to 50 wt % In and greater than 0 to 30 wt % X with the remainder being Sn, such that the second alloy has a solidus temperature between around 100° C. and around 200° C.

19. The braided solder wire rope of claim 1, wherein the second alloy or metal comprises Sn—Sb that comprises from greater than 0 to 50 wt % Sb with the remainder being Sn, such that the second alloy has a solidus temperature of around 230° C. and above.

20. The braided solder wire rope of claim 1, wherein the second alloy or metal comprises Sn—Sb—X (X=Ag, Al, Au, Bi, Co, Cu, Ga, Ge, In, Mn, Ni, P, Pd, Pt, or Zn) that comprises from greater than 0 to 50 wt % Sb and greater than 0 to 30 wt % X with the remainder being Sn, such that the second alloy has a solidus temperature between around 220° C. and around 250° C.

21. The braided solder wire rope of claim 20, wherein the Sn—Sb X comprises from greater than 0 to 20 wt % Sb and greater than 0 to 5 wt % X with the remainder being Sn, such that the second alloy has a solidus temperature of 230° C. and above.

22. The braided solder wire rope of claim 1, wherein the second alloy or metal comprises Bi—In that comprises from greater than 0 to 50 wt % In with the remainder being Bi, such that the second alloy has a solidus temperature between around 100° C. and around 200° C.

23. The braided solder wire rope of claim 1, wherein the second alloy or metal comprises Bi—In—X (X=Ag, Al, Au, Co, Cu, Ga, Ge, Mn, Ni, P, Pd, Pt, Sb, or Zn) that comprises from greater than 0 to 50 wt % In and from greater than 0 to 30 wt % X with the remainder being In, such that the second alloy has a solidus temperature between around 100° C. and around 200° C.

24. The braided solder wire rope of claim 1, wherein the first wire and the second wire have different gauge sizes.

25. The braided solder wire rope of claim 1, further comprising: a third wire composed of the first alloy or the second alloy or metal, wherein the third wire is braided with the first wire and the second wire.

* * * * *